Dec. 30, 1952    J. A. BYINGTON    2,623,652
BOX DUMPING APPARATUS
Filed Dec. 5, 1951    4 Sheets-Sheet 1
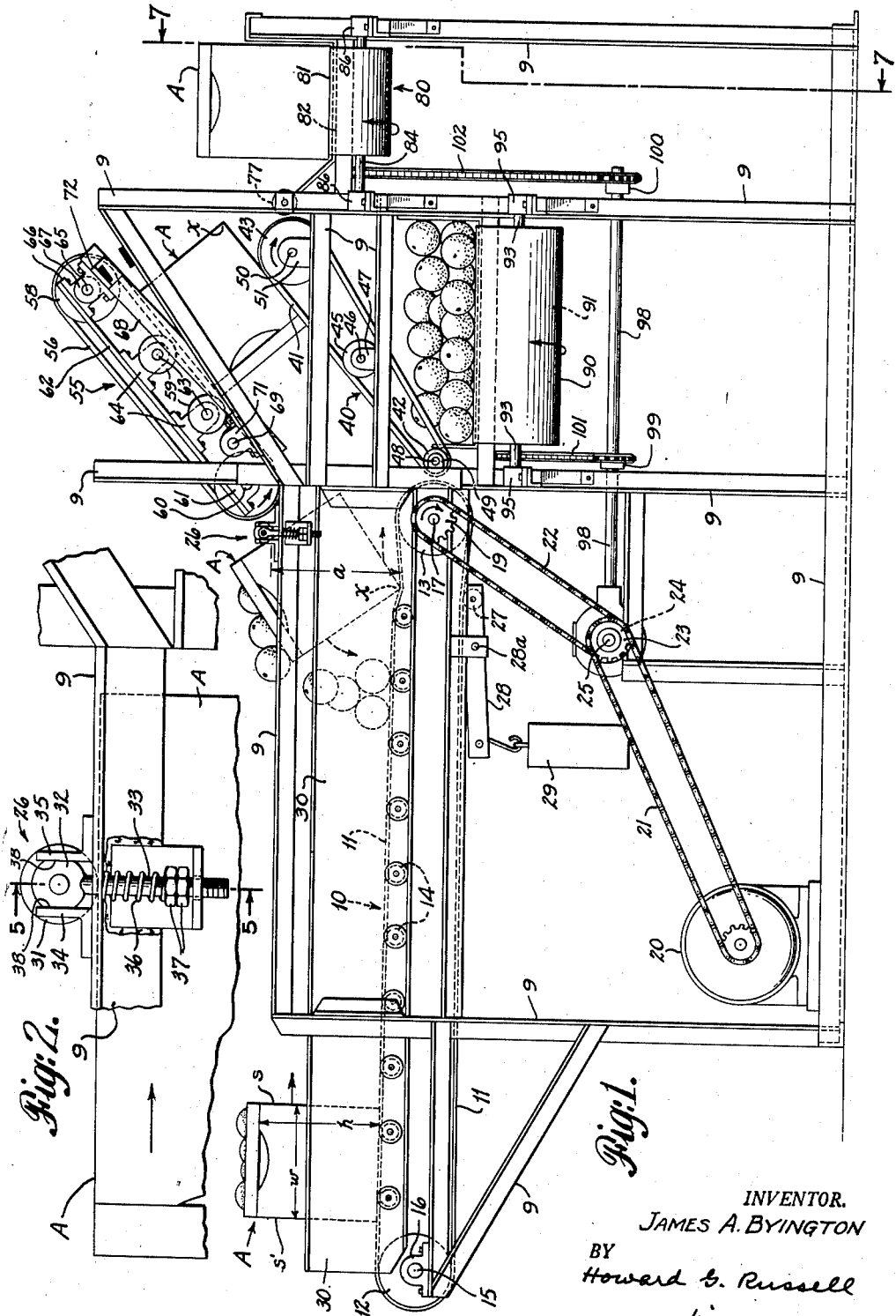
INVENTOR.
JAMES A. BYINGTON
BY
Howard G. Russell
his ATTORNEY Dec. 30, 1952 J. A. BYINGTON 2,623,652
BOX DUMPING APPARATUS
Filed Dec. 5, 1951 4 Sheets-Sheet 2
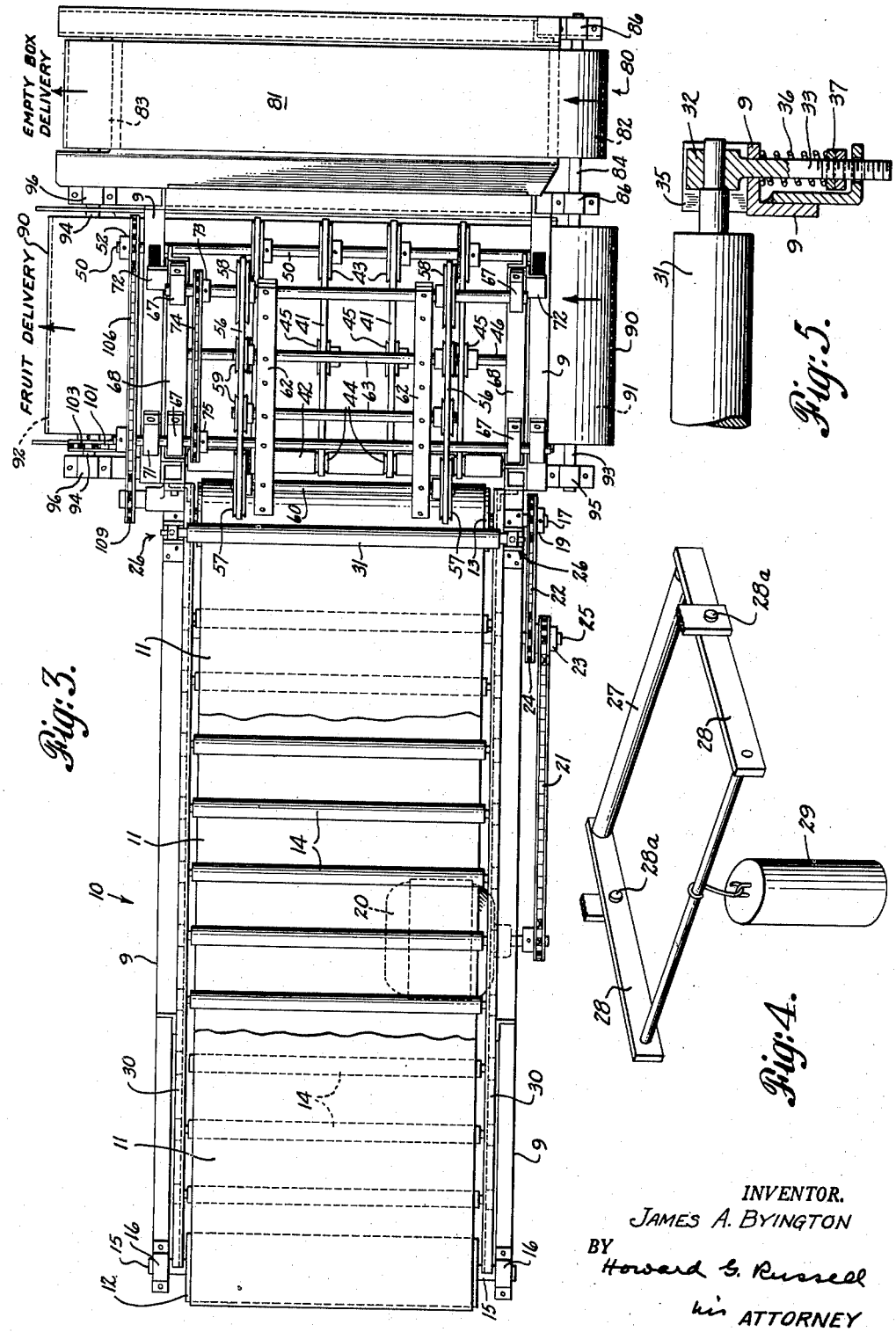
INVENTOR.
JAMES A. BYINGTON
BY Howard G. Russell
his ATTORNEY

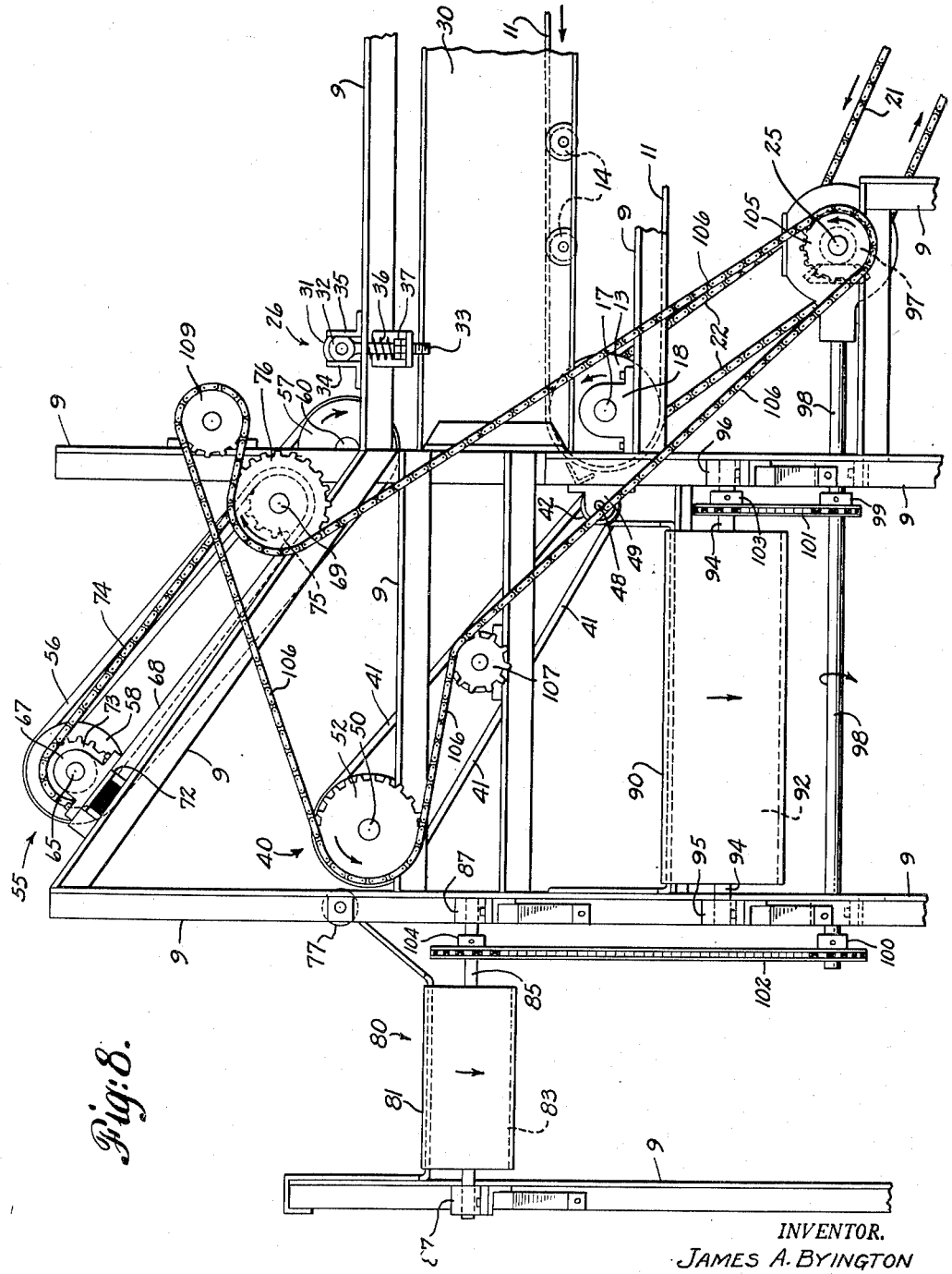

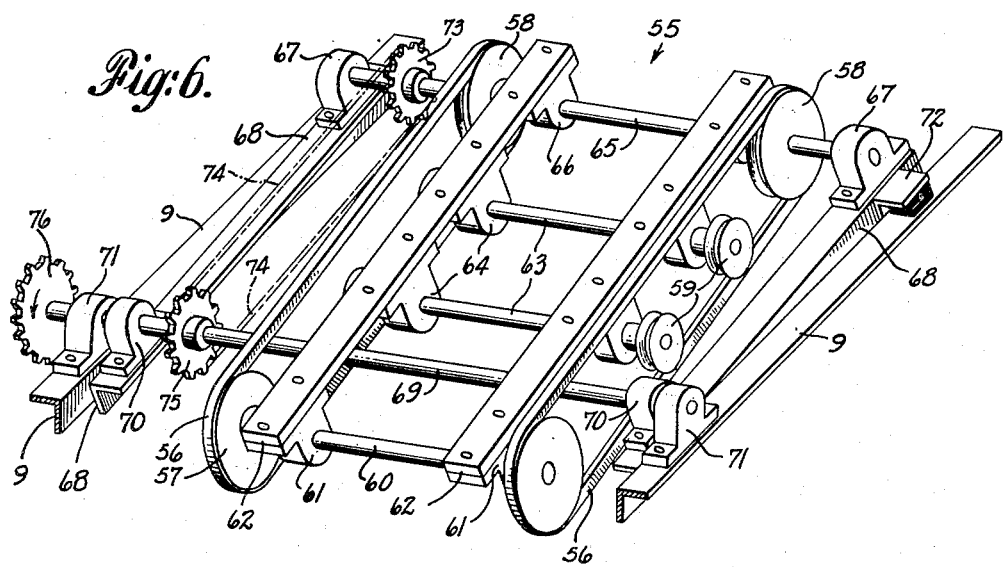
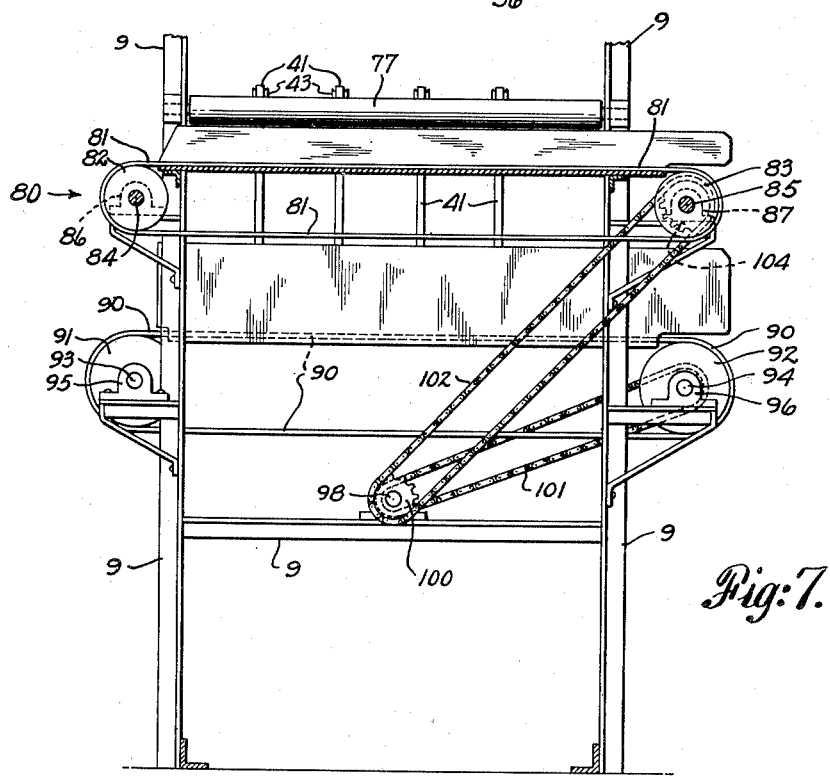

Patented Dec. 30, 1952

2,623,652

UNITED STATES PATENT OFFICE 2,623,652

BOX DUMPING APPARATUS

James Augustus Byington, Orlando, Fla., assignor to Fruit Treating Corporation, Orlando, Fla., a corporation of Florida Application December 5, 1951, Serial No. 260,000

7 Claims. (Cl. 214—318)

This invention relates to an improved box dumping apparatus, and more particularly to an improved apparatus designed to receive produce filled boxes, gently remove their contents and discharge the produce at one point and the emptied boxes at another point, thereby saving labor and handling costs.

In the processing of fruit, vegetables and the like, the produce is generally collected on the farm and placed in boxes which are later delivered to a processing plant. In order to prepare the produce for market it is generally first washed, color treated, sorted and graded.

This invention provides a box handling and dumping apparatus for the processing plant which will rapidly remove the produce from the boxes without injuring it thus saving labor and handling costs.

More particularly, this invention provides an improved apparatus designed to receive produce filled boxes one at a time, on an endless conveyor. The apparatus empties the boxes without injury to the contents, and discharges the produce at one point and the empty boxes at another.

Various other features and advantages of this invention will become apparent as the disclosure proceeds.

Although the novel features which are believed to be characteristic of the invention are particularly pointed out in the claims appended hereto, the invention itself, its objects and advantages and the manner in which it may be carried out, may better be understood by referring to the following description taken in connection with the accompanying drawings forming a part hereof, in which Fig. 1 is a side elevational view partly in section of the improved box dumping apparatus illustrating the main parts of the apparatus;

Fig. 2 is a side elevational view partly in cross section of an element for overturning filled boxes;

Fig. 3 is a top plan view of the apparatus;

Fig. 4 is a perspective view of an element for tensioning the main conveyor belt of the apparatus;

Fig. 5 is a partial front elevational view partly in cross section of the element for overturning boxes;

Fig. 6 is a perspective view of a conveyor assisting in the handling of empty boxes;

Fig. 7 is a cross sectional view of the apparatus as the same would appear if taken along line 7—7 of Fig. 1 in the direction of the indicating arrows;

Fig. 8 is a side elevational view of the apparatus illustrating the arrangement of driving belts and chains.

The improved dumping apparatus comprises, briefly, an endless main conveyor 10 designed to receive produce filled boxes A, one at a time. The conveyor 10 moves the boxes A to a dumping point where a trip element 26 turns the filled boxes A over on their side, thus emptying them, as illustrated in Fig. 1. The emptied box is then further carried to a second conveyor 40 which cooperates with a third conveyor 55 as illustrated in Fig. 1 and carries the emptied box A to a discharge point, which may be a further conveyor. The dumped produce on the main conveyor 10 meanwhile is carried along and discharged onto a produce gathering conveyor as illustrated in Fig. 1. Successive boxes placed on the main conveyor 10 are similarly handled.

Referring more particularly to Figs. 1 and 3, the main conveyor 10 comprises an endless conveyor belt 11. One end of the conveyor belt 11 is trained around a roller 12 and the other end around a roller 13. A plurality of smaller rollers 14 support the box load on the conveyor belt 11 intermediate the rollers 12 and 13. The roller 12 has a shaft 15 journalled in bearings 16 secured to the framework 9 of the apparatus.

Similarly, the roller 13 has a shaft 17 journalled in bearings 18 secured to the framework 9. The roller 13 is driven by a sprocket 19 secured to the shaft 17. Sprocket 19, in turn, is driven by a motor 20 transmitting power through driving chains 21 and 22 trained, respectively, around sprockets 23 and 24 on the shaft 25.

It will thus be appreciated that a box A placed on the main conveyor 10 will be carried forward by the conveyor until the side of the box $s$ strikes the trip element 26 which extends into the path of the box at a height $a$ above the conveyor belt 11 preferably greater than one half the height $h$ of the side of the box. The trip element 26 turns the box A on its side as illustrated in Fig. 1, thereby causing the box contents to spill gently onto the moving conveyor belt 11. It will be noted that while the box A is being turned on its side by the trip element 26, the trailing corner edge $x$ of the box side $s$ tends to dig into the conveyor belt 11. In order to allow for necessary expansion of the conveyor belt 11 during this tipping operation and to prevent unnecessary wear and tear on the conveyor belt 11, the belt 11 fits loosely over the rollers 12, 13 and 14, the slack being taken up by a roller 27 engaging the return run of the conveyor belt 11. The takeup roller 27 is mounted on a tilting frame 28 pivoted at a point 28a. A counterweight 29 on the tilting frame 28 tends to tilt the frame countertilting frame 28 tends to tilt the frame counterclockwise, thereby tensioning the belt 11. Guard rails 30 on either side of the conveyor belt 11 guide the boxes A and also prevent the dumped produce from falling off the sides of the conveyor belt 11.

The trip element 26 comprises a trip roller 31 horizontally and rotatably mounted above the conveyor belt 11 in the path of approaching boxes. The trip roller 31 has freedom of vertical movement. For this purpose, each end of the trip roller 31 is journalled in a bearing 32 on the end of a stud 33 vertically slidable in brackets 34 and 35 on the frame 9. A spring 36 telescoped over the stud 33 engages the frame 9 on top and bears with its lower end against nuts 37 on the threaded lower portion of the stud 33 for the purpose of spring tension adjustment. The bearings 32 are provided with vertical guide surfaces 38 for the brackets 34, 35 which have machined side surfaces resting against the guide surfaces 38. It will thus be appreciated that a box side s coming into contact with the trip roller 31 will lift the trip roller 31 vertically against the action of the spring 36. After the box A has been turned on its side, the spring returns the trip roller 31 to its original position.

After the trip roller 31 has turned a box on its side and dumped the produce on the conveyor 10, the conveyor 10 carries the box A and the produce to their respective discharge points, as illustrated in Fig. 1.

A second conveyor 40, substantially in line with and beyond the discharge end of the main conveyor 10, receives the emptied boxes and carries them to a discharge point. The second conveyor 40 comprises several horizontally spaced belts 41 trained over the roller 42 at one end and pulleys 43 at the other end. The roller 42 has channels 44 which keep the belts 41 in alignment with pulleys 43. A shaft 46 carries belt supporting pulleys 45 and is mounted in bearings 47 on the framework 9. The pulleys 46 support the load carrying run of the conveyor 40. Roller 42 has a shaft 48 mounted in bearings 49 secured to the framework 9. Pulleys 43 are fixed to a shaft 50 riding in bearings 51 secured to the framework 9 of the apparatus. The conveyor 40 is driven by sprocket 52 secured to the shaft 50.

The second conveyor 40 is upwardly inclined with respect to the main conveyor 10 and commences its run below the run of the main conveyor 10. As a box A is discharged by the conveyor belt 11, the run of the second conveyor 40 engages the bottommost leading edge x of the box A and carries it upwardly.

A third conveyor 55, illustrated in Figs. 1, 3 and 6, extends substantially parallel with the load carrying run of the second conveyor 40 and is spaced a distance therefrom substantially equal to the width w of boxes resting on the second conveyor 40. The third conveyor 55 and the second conveyor 40 form a nip, so to speak, for carrying the empty box A to the discharge point.

The third conveyor 55 comprises a pair of horizontally spaced belts 56 and has freedom to change its distance with regard to the second conveyor 40. For this purpose the third conveyor is tiltably mounted on a tilting frame 62 which in turn is tiltably mounted on the machine framework 9.

The spaced belts 56 of the conveyor are trained around pulleys 57 on a shaft 60 and pulleys 58 on a shaft 65. The two shafts 60 and 65 are rotatable in bearings 61 and 66 on spacing bars 62. Guide pulleys 59 intermediate the ends of the belts 56 support the load carrying run of the third conveyor 55. Shafts 63 are rotatable in bearing 64 on spacing bars 62.

The shaft 65 is also rotatable in bearing 67 of an intermediate tilting frame 68, the frame 68 being tiltable about a shaft 69. Bearings 70 for the shaft 69 are mounted on the tilting frame 68 and further bearings 71 are mounted on the machine framework 9. Thus, the intermediate tilting frame 68 is tiltable with respect to the machine framework 9 about the axis 69 and the third conveyor assembly, including the belts 56, the spacing bar 62, and the supporting pulleys 69 are tiltable with respect to the intermediate frame 68 about the axis 65.

The shaft 69 acts as a stop limiting the tilting movement of the bars 62 about the axis 65 towards the second conveyor, and stops 72 limit the tilting movement of the intermediate frame 68 about the axis 69 towards the second conveyor.

The third conveyor 55 is driven by sprocket 73 secured to the shaft 65. The sprocket 73 is in turn driven by a chain 74 trained around sprocket 75 secured to the shaft 69. Sprocket 76 is secured to the shaft 69.

A box A tipped over on its side s' by the tripping element 26 dumps the box contents, for example, oranges, on the conveyor belt 11 as illustrated in Fig. 1. The empty box is then discharged from the conveyor belt 11 onto the second conveyor 40. It will be noted that the conveyor 40 commences its run at a point below the discharge end of the conveyor belt 11. Thus, an emptied box A being conveyed from the conveyor belt 11 will first have its leading bottommost edge x engage the conveyor belt 41 and be carried upwardly by the conveyor belt 41. The third conveyor 55 cooperates with the second conveyor 40 and engages the top side of the box A which thus travels to the box discharge point. As the box A approaches the end of the second conveyor 40 gravity will tend to roll the box over the pulley 43. It should be noted, however, that the conveyor 55 still engages the top side of the box beyond the roll off point on conveyor 40, thereby ensuring positive handling of the empty box at the end of the conveyor 40.

An idler roller 77 rotatably mounted on the framework 9 is provided immediately adjacent the discharge end of conveyor 40 and guides boxes leaving the conveyor 40 so that the boxes come to rest in upright position on a fourth conveyor 80 which takes the empty boxes to the discharging station. The fourth conveyor 80 comprises a conveyor belt 81 having a run below and substantially horizontal to the run of conveyor 40. The conveyor belt 81 is trained around a drum 82 at one end and a drum 83 at the other end. Drums 82 and 83 have shafts 84 and 85 respectively, which are journalled in bearings 86 and 87 secured to the framework 9 of the apparatus.

Dumped fruit or produce is discharged from the conveyor belt 11 onto a produce gathering belt 90. The belt 90 is trained around a drum 91 at one end and a drum 92 at the other. The belt 90 is mounted slightly below the discharge end of conveyor belt 11 and substantially at right angles. Fruit from the conveyor belt 11 rolls onto the belt 90 and is carried to a fruit gathering point. Drums 91 and 92 have shafts 93 and 94 mounted in bearings 95 and 96 on the framework 9 of the apparatus.

The improved box dumping apparatus is preferably powered by a single motor 20 which transmits power to the conveyor belt 11 through driving chains 21 and 22 trained around sprockets 23 and 24 on the shaft 25. The shaft 25 is connected to a bevel gear 97 which transmits power to the shaft 98. Shaft 98 is provided with a pair of sprockets 99 and 100 around which chains 101 and 102 are trained which drive sprockets 103 and 104 on the shafts 85 and 94 respectively of the conveyor belts 81 and 90.

Conveyor 40 and conveyor 55 are driven from sprocket 105 secured to the shaft 25. A drive chain 106 trained around the sprocket 105 extends over an idler sprocket 107, a driving sprocket 52, a second idler sprocket 109, a sprocket 76 and finally back to the sprocket 105. Sprocket 52 thus drives the conveyor belt 41 and sprocket 76 drives the conveyor belt 56.

While certain novel features of this invention have been disclosed and are pointed out in the annexed claims, it will be understood that various omissions, substitutions and changes may be made by those skilled in the art without departing from the spirit of this invention.

I claim:

1. A box dumping apparatus comprising in combination a movable main conveyor for boxes, a trip element extending into the path of boxes on said main conveyor at a distance above said main conveyor equal to more than one-half the height of said boxes for turning the boxes over on one side causing the box contents to spill on said main conveyor, a second conveyor, substantially in line with and beyond the discharge end of said main conveyor, said second conveyor being upwardly inclined with respect to said main conveyor for engaging the bottommost leading edge of boxes leaving said main conveyor, yieldable guide means substantially parallel with the load carrying run of said second conveyor and spaced a distance therefrom substantially equal to the width of boxes resting on said second conveyor, means beyond the discharge end of said second conveyor for carrying boxes away, and means beyond the discharge end of said main conveyor for collecting dumped box contents.

2. A box dumping apparatus comprising in combination a movable main conveyor for boxes, a trip element extending into the path of boxes on said main conveyor at a distance above said main conveyor equal to more than one-half the height of said boxes for turning the boxes over on one side causing the box contents to spill on said main conveyor, a second conveyor, substantially in line with and beyond the discharge end of said main conveyor, said second conveyor comprising horizontally spaced belts upwardly inclined with respect to said main conveyor for engaging the bottommost leading edge of boxes, said spaced belts having a central space between them for the discharge of box contents from said main conveyor, yieldable guide means substantially parallel with the load carrying run of said second conveyor and spaced a distance therefrom substantially equal to the width of boxes resting on said second conveyor, means beyond the discharge end of said second conveyor for carrying boxes away, and means beyond the discharge end of said main conveyor for collecting dumped box contents.

3. A box dumping apparatus comprising in combination a movable main conveyor for boxes, a trip element extending into the path of boxes on said main conveyor at a distance above said main conveyor equal to more than one-half the height of said boxes for turning the boxes over on one side causing the box contents to spill on said main conveyor, a second conveyor, substantially in line with and beyond the discharge end of said main conveyor, said second conveyor being upwardly inclined with respect to said main conveyor for engaging the bottommost leading edge of boxes, a third conveyor having a run substantially parallel with the load carrying run of said conveyor and spaced a distance therefrom substantially equal to the width of boxes resting on said second conveyor, said third conveyor being mounted with freedom of movement towards and away from said second conveyor, means beyond the discharge end of said second conveyor for carrying boxes away, and means beyond the discharge end of said main conveyor for collecting dumped box contents.

4. A box dumping apparatus comprising in combination a movable main conveyor for boxes, a trip element extending into the path of boxes on said main conveyor at a distance above said main conveyor equal to more than one-half the height of said boxes for turning the boxes over on one side causing the box contents to spill on said main conveyor, a second conveyor, substantially in line with and beyond the discharge end of said main conveyor, said second conveyor comprising horizontally spaced belts upwardly inclined with respect to said main conveyor for engaging the bottommost leading edge of boxes, said spaced belts leaving a central space between them for the discharge of box contents from said main conveyor, a third conveyor having a run substantially parallel with the load carrying run of said second conveyor and spaced a distance therefrom substantially equal to the width of boxes resting on said second conveyor, said third conveyor being mounted with freedom of movement towards and away from said second conveyor and extending beyond the run of said second conveyor, means beyond the discharge end of said second conveyor for carrying boxes away, and means beyond the discharge end of said main conveyor for collecting dumped box contents.

5. A box dumping apparatus comprising in combination a movable main conveyor for boxes, a trip element extending into the path of boxes on said main conveyor at a distance above said main conveyor equal to more than one-half the height of said boxes for turning the boxes over on one side causing the box contents to spill on said main conveyor, a second conveyor, substantially in line with and beyond the discharge end of said main conveyor, said second conveyor being upwardly inclined with respect to said main conveyor for engaging the bottommost leading edge of boxes leaving said main conveyor, a third power driven conveyor having a run substantially parallel with the load carrying run of said second conveyor and spaced a distance therefrom substantially equal to the width of boxes resting on said conveyor, said third conveyor being mounted with freedom of movement towards and away from said second conveyor, said second conveyor terminating short of the said third conveyor with respect to boxes travelling between said second and said third conveyor, the second conveyor having an end roller over which it is trained, said end roller being a pivot point for boxes passing beyond the end of said second conveyor but still in engagement with said third conveyor, means beyond the discharge end of said second conveyor for carrying boxes away, and means beyond the discharge end of said main conveyor for collecting dumped box contents.

6. A box dumping apparatus comprising in combination a movable main conveyor for boxes, a trip element extending into the path of boxes on said main conveyor at a distance above said main conveyor equal to more than one-half the height of said boxes for turning the boxes over on one side causing the box contents to spill on said main conveyor, a second conveyor, substantially in line with and beyond the discharge end of said main conveyor, said second conveyor being upwardly inclined with respect to said main conveyor for engaging the bottommost leading edge of boxes leaving said main conveyor, a third power driven conveyor having a run substantially parallel with the load carrying run of said second conveyor and spaced a distance therefrom substantially equal to the width of boxes resting on said second conveyor, said third conveyor being pivotally mounted with freedom of movement towards and away from said second conveyor, said second conveyor terminating short of the said third conveyor with respect to boxes travelling between said second and third conveyors, the second conveyor having an end roller over which it is trained, said end roller being a pivot point for boxes passing beyond the end of said second conveyor but still in engagement with said third conveyor, means beyond the discharge end of said second conveyor for carrying boxes away, and means beyond the discharge end of said main conveyor for collecting dumped box contents.

7. A box dumping apparatus comprising in combination a movable main conveyor for boxes, a trip element extending into the path of boxes on said main conveyor at a distance above said main conveyor equal to more than one-half the height of said boxes for turning the boxes over on one side causing the box contents to spill on said main conveyor, a split second conveyor comprising horizontally spaced belts leaving spaces between the belts through which box contents may drop, said second conveyor being substantially in line with and beyond the discharge end of said main conveyor, a third power driven conveyor having a run substantially parallel with the load carrying run of said second conveyor and spaced a distance therefrom substantially equal to the width of boxes resting on said second conveyor, said third conveyor being mounted with freedom of movement towards and away from said second conveyor, said second conveyor being upwardly inclined with respect to said main conveyor for engaging the bottommost leading edge of boxes and having an end roller whereby said end roller becomes a pivot point for boxes passing beyond the end of said second conveyor but still in engagement with said third conveyor, means beyond the discharge end of said second conveyor for carrying boxes away, and a fourth conveyor extending underneath the split second conveyor for carrying box contents away.

JAMES AUGUSTUS BYINGTON.

REFERENCES CITED

The following references are of record in the file of this patent:

UNITED STATES PATENTS

| Number | Name | Date |
|---|---|---|
| 1,907,458 | Stevenson | May 9, 1933 |
| 2,271,937 | Engels | Feb. 3, 1942 |
| 2,517,956 | Albertoli | Aug. 8, 1950 |